(12) United States Patent
Heilmann et al.

(10) Patent No.: US 8,581,774 B2
(45) Date of Patent: Nov. 12, 2013

(54) METHOD FOR DETECTING PRECIPITATION USING A RADAR LOCATING DEVICE FOR MOTOR VEHICLES

(75) Inventors: Stefan Heilmann, Vailhingen/Enz (DE); Dirk Bechler, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 141 days.

(21) Appl. No.: 13/138,164

(22) PCT Filed: Dec. 1, 2009

(86) PCT No.: PCT/EP2009/066147
§ 371 (c)(1), (2), (4) Date: Sep. 29, 2011

(87) PCT Pub. No.: WO2010/086048
PCT Pub. Date: Aug. 5, 2010

(65) Prior Publication Data
US 2012/0013503 A1    Jan. 19, 2012

(30) Foreign Application Priority Data
Jan. 29, 2009    (DE) .................. 10 2009 000 472

(51) Int. Cl.
*G01S 13/00*    (2006.01)
(52) U.S. Cl.
USPC .... 342/26 R; 342/26 A; 342/26 B; 342/26 C; 342/70; 342/159
(58) Field of Classification Search
USPC .... 342/26 R, 26 A, 26 B, 26 C, 26 D, 70–72, 342/89–93, 159–164
See application file for complete search history.

(56) References Cited

U.S. PATENT DOCUMENTS

| | | | | |
|---|---|---|---|---|
| 3,567,915 A | * | 3/1971 | Altshuler et al. | 702/49 |
| 3,623,095 A | * | 11/1971 | Gerardin et al. | 342/94 |
| 3,650,628 A | * | 3/1972 | Tawfik et al. | 356/5.05 |
| 3,706,993 A | * | 12/1972 | Kuck | 342/160 |
| 3,741,655 A | * | 6/1973 | Ling et al. | 356/5.03 |

(Continued)

FOREIGN PATENT DOCUMENTS

| | | |
|---|---|---|
| DE | 10 2006 054 320 | 5/2008 |
| JP | 04-309883 | 11/1992 |

OTHER PUBLICATIONS

A. Ludloff: Praxiswissen—Radar and Radarsignalverarbeitung [Practical Knowledge—Radar and Radar Signal Processing], 3rd Edition, Vieweg Publishing House 2002).

(Continued)

*Primary Examiner* — Jack W Keith
*Assistant Examiner* — Peter Bythrow
(74) *Attorney, Agent, or Firm* — Kenyon & Kenyon LLP

(57) ABSTRACT

A method for detecting precipitation using a radar locating device for motor vehicles, that is designed to locate objects in the surroundings of the vehicle, in which method a locating signal (42), which is an index for the received power density as a function of the distance (R), is integrated over a first distance range (INT1), which is below a limit distance ($R_{lim}$) for the detection of precipitation, wherein the locating signal (42) is additionally integrated over a second distance range (INT2), which is above limit distance ($R_{lim}$), and for the detection of precipitation, the integrals over the first and second distance range are compared with each other.

7 Claims, 3 Drawing Sheets

(56) References Cited

U.S. PATENT DOCUMENTS

| | | | |
|---|---|---|---|
| 4,005,416 A * | 1/1977 | Tucker et al. | 342/90 |
| 4,121,889 A * | 10/1978 | Soderstrom | 356/5.03 |
| 4,134,677 A * | 1/1979 | Ling et al. | 356/5.03 |
| 4,173,017 A * | 10/1979 | Burlage et al. | 342/162 |
| 4,208,125 A * | 6/1980 | Ling | 356/5.03 |
| 4,347,618 A * | 8/1982 | Kavouras et al. | 375/259 |
| 4,489,319 A * | 12/1984 | Hansen | 342/93 |
| 4,490,720 A * | 12/1984 | Kuntman | 342/195 |
| 4,605,302 A * | 8/1986 | Lofgren et al. | 356/5.06 |
| 4,643,564 A * | 2/1987 | Lofgren et al. | 356/5.05 |
| 4,722,599 A * | 2/1988 | Fruengel et al. | 356/5.06 |
| 4,899,159 A * | 2/1990 | Marchant | 342/90 |
| 5,012,251 A * | 4/1991 | Kennedy et al. | 342/176 |
| 5,179,712 A * | 1/1993 | Abboud | 712/300 |
| 5,311,183 A * | 5/1994 | Mathews et al. | 342/26 B |
| 5,499,030 A * | 3/1996 | Wicks et al. | 342/93 |
| 5,565,870 A * | 10/1996 | Fukuhara et al. | 342/70 |
| 5,644,315 A * | 7/1997 | Long | 342/93 |
| 5,748,142 A * | 5/1998 | Rademacher | 342/159 |
| 5,808,579 A * | 9/1998 | Rademacher | 342/93 |
| 5,945,926 A * | 8/1999 | Ammar et al. | 340/970 |
| 5,949,368 A * | 9/1999 | DeCesare | 342/93 |
| 6,188,350 B1 * | 2/2001 | Neumerkel et al. | 342/104 |
| 6,489,915 B1 * | 12/2002 | Lines et al. | 342/26 B |
| 6,577,265 B2 * | 6/2003 | Dalton et al. | 342/26 R |
| 6,809,682 B1 * | 10/2004 | Madewell | 342/160 |
| 6,894,638 B2 * | 5/2005 | Matsuda et al. | 342/26 R |
| 6,937,185 B1 * | 8/2005 | Collazo et al. | 342/159 |
| 7,158,217 B2 * | 1/2007 | Hoashi et al. | 356/4.01 |
| 2004/0041725 A1 * | 3/2004 | Matsuda et al. | 342/26 |
| 2004/0061640 A1 * | 4/2004 | Cornic et al. | 342/70 |

OTHER PUBLICATIONS

Blake, S.: "OS-CFAR Theory for Multiple Targets and Nonuniform Clutter" IEEE Transactions on Aerospace and Electronic Systems, vol. 24, No. 6, Nov. 1988, pp. 785-790, XP002564047, USA.

\* cited by examiner

METHOD FOR DETECTING PRECIPITATION USING A RADAR LOCATING DEVICE FOR MOTOR VEHICLES

BACKGROUND OF THE INVENTION

1. Field of the Invention

The present invention relates to a method for detecting precipitation using a radar locating device for motor vehicles that is designed to locate objects in the surroundings of the vehicle, in which method a locating signal, which is an index for the received power density as a function of the distance, is integrated over a first distance range that is below a limit distance for the detection of precipitation.

2. Description of Related Art

Radar locating devices are frequently used in driver assistance systems for motor vehicles, for example, for an automatic distance regulation or for the early detection of a risk of collision.

Precipitation in the form of rain or also spray spattering up from the road may reflect a portion of the emitted radar radiation and thus cause a reduction of the range of the radar radiation and thus a reduction of the locating depth of the radar sensor. For reasons of traffic safety, it is important that it is possible to detect such a restriction of the function of the radar locating device preferably without delay.

Published German patent application document DE 10 2006 054 320 A1 describes a method of the type mentioned at the outset for a multibeam radar, in particular for an FMCW radar locating device. In this method, the locating signals of a plurality of radar beams are respectively separately integrated, and the resulting integrals are compared to one another.

The functional principle of an FMCW radar locating device (Frequency Modulated Continuous Wave) consists in the radar signal being continuously emitted; however, the frequency of this signal is periodically modulated with rising and falling ramps (in this instance, the term "ramp" is not to mean that the frequency modulation within the "ramp" necessarily has to be linear.) A mixer mixes a portion of the transmission signal with the signal received by the antenna and thus generates a mixed product whose frequency corresponds with the difference between the frequency of the current transmission signal and the frequency of the received signal.

If a radar echo from a located object is received, the frequency of the mixed product is thus a function of the signal propagation time and thus the distance of the object, but, due to the Doppler effect, it is also a function the relative speed of the reflecting object. Thus, in the spectrum formed from the mixed product, each located object emerges on each modulation ramp as a peak in the frequency that is a function of the distance and the relative speed. The distance and the relative speed of the object may then be determined by comparing the frequency positions of peaks that derive from the same object, on modulation ramps having different slopes.

Rain drops or spattering spray also constitute "objects" in this sense, which leave a weak but still detectable peak in the spectrum when the radar sensor is not at too great a distance, at distances up to approximately 10-50 m, for example. In the event of heavy precipitation, these peaks in the frequency range, which corresponds to the above-mentioned distance range, add up to a background signal, the so-called rain clutter. The power of this rain clutter is thus an index for the presence and the strength of precipitation.

BRIEF SUMMARY OF THE INVENTION

The objective of the present invention is to indicate a method for detecting precipitation, which method is more robust with regard to interference influences.

According to the present invention, this objective is achieved in that the locating signal is integrated additionally over a second distance range that is above the limit distance, and in that for the detection of precipitation the integrals over the first and second distance range are compared to one another.

The method according to the present invention has the advantage that the precipitation detection is less significantly impaired by interference influences, for example, by temperature or aging effects of the electronic components of the radar locating device, effects of the installation location and the installation conditions of the radar locating device in the vehicle, special properties of the locating device itself, and the like. Thus, in total, an improved mass production suitability and robustness of the radar locating system is achieved. In addition, in an FMCW radar, an additional advantage is that the method is also independent of the special selection of the parameters of the modulation ramps.

The interference influences mentioned influence the integrals formed over the first and second distance range in the same manner, while the rain clutter increases only the value of the first integral, but not the value of the second integral. The interference influences mentioned may be largely eliminated in that the two integrals are compared to one another to detect precipitation.

Advantageous embodiments of and further refinements of the present invention are delineated in the dependent claims.

In one advantageous specific embodiment of the method according to the present invention, real objects such as preceding vehicles and the like are effectively masked through a filter procedure, so that the subsequent integrations essentially record only those portions of the signal that are caused by noise and rain clutter.

For example, the integrand is a detection threshold that is obtained through a noise estimation and at the same time may be used to differentiate the real object peaks from the noise background (and, if applicable, the rain clutter). Such a noise estimation may be implemented by a hierarchy filter and is known in the literature under the name "ordered statistic constant false alarm rate" (OS-CFAR) (A. Ludloff: Praxiswissen—Radar und Radarsignalverarbeitung [Practical Knowledge—Radar and Radar Signal Processing], 3rd Edition, Vieweg Publishing House 2002). Due to its adaptivity, the detection threshold adjusts to the respective strength of the rain clutter; however, on the other hand it is not influenced by narrow-band individual peaks caused by "compact" radar targets such as vehicles, for example.

BRIEF DESCRIPTION OF THE DRAWINGS

An exemplary embodiment of the present invention is illustrated in the drawing and explained in greater detail in the following description.

DETAILED DESCRIPTION OF THE INVENTION

Figure 1:
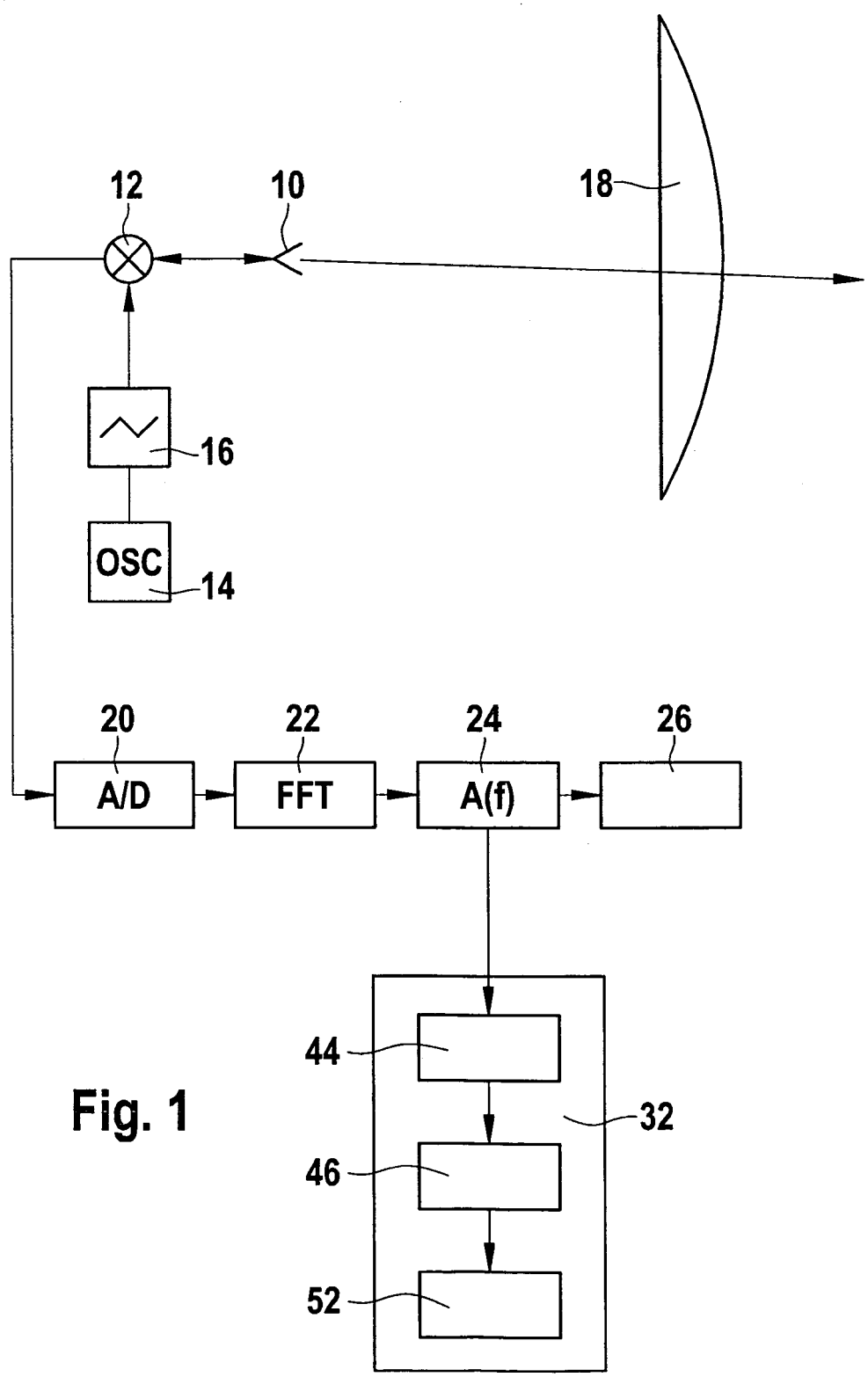
FIG. 1 shows a block diagram of a radar locating device by which the method according to the present invention may be implemented.

The radar locating device illustrated in FIG. 1 has an antenna 10, which is supplied via a mixer 12 with a transmission signal (FMCW radar) that is generated by an oscillator 14 and frequency-modulated by a modulator 16. The signal emitted by antenna 10 is bundled by a radar lens 18.

If an object (not shown in FIG. 1) is located by the radar locating device, then the signal reflected by the object is bundled again by the lens onto the same antenna 10 that emitted the transmission signal (monostatic antenna concept). In mixer 12, the received signal is mixed with a portion of the transmission signal, and a time-dependent signal (intermediate frequency signal) is obtained as a mixed product, which is sampled and digitized in an analog/digital converter stage 20. In a transformation stage 22, the digitized signal is converted, for example, through fast Fourier transformation (FFT) into a spectrum, in the following labeled locating signal 24, that indicates the dependency of the amplitude of the mixed product on frequency f. When the Doppler effect is disregarded, frequency f is proportional to distance R of the respective reflection target. In terms of its absolute value, the relative speed of the rain drops is approximately equal to the velocity of the vehicle that is equipped with the radar system. This relative speed therefore results in a shift in frequency, which may be determined by way of calculation. At least within certain limits, it may thus be said that locating signal 24 also constitutes indirectly an index for the received power density as a function of distance R. Thus, in the following, the locating signal is to be considered, in somewhat simplifying fashion, as a function of the distance. In an evaluation stage 26, locating signal 24 is further evaluated, in order to determine the distances and relative speeds of the located objects and—in the case of a multibeam radar—also their azimuth angles.

Figure 2:
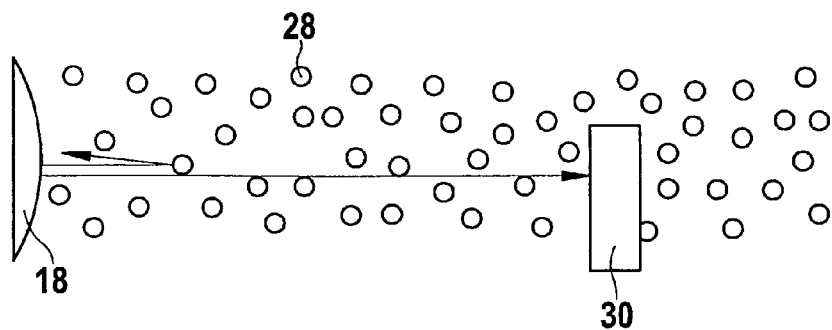
FIG. 2 shows a schematic sketch regarding the detection of precipitation.

In FIG. 2, precipitation in the form of drops 28 is shown, which drops fill up the entire space between radar lens 18 and an object 30 to be located. Each of drops 28 acts as a small reflection target that leaves behind a small peak in the spectrum, that is, in locating signal 24. These peaks are scattered across a broad frequency band and contribute to the background as so-called rain clutter; however, only up to a specific frequency limit, which corresponds to limit distance $R_{lim}$, in which a radar echo from the individual rain drops is still detectable (in practice, approx. 10 to 50 m). On the other hand, the reflections by individual drops 28 weaken the radar signal that reaches object 30 and after being reflected is received again by the locating device. This may cause the sensitivity of the locating device to be significantly restricted, for example, in the event of very heavy rain.

The radar locating device therefore has a detection device 32 that allows for the detection of the presence of precipitation and the quantitative evaluation of the strength of the precipitation, so that it is possible to estimate the extent to which the functionality of the locating system is restricted by precipitation. For this purpose, detection device 32 evaluates locating signal 24, as described in the following in more detail.

Figure 3:
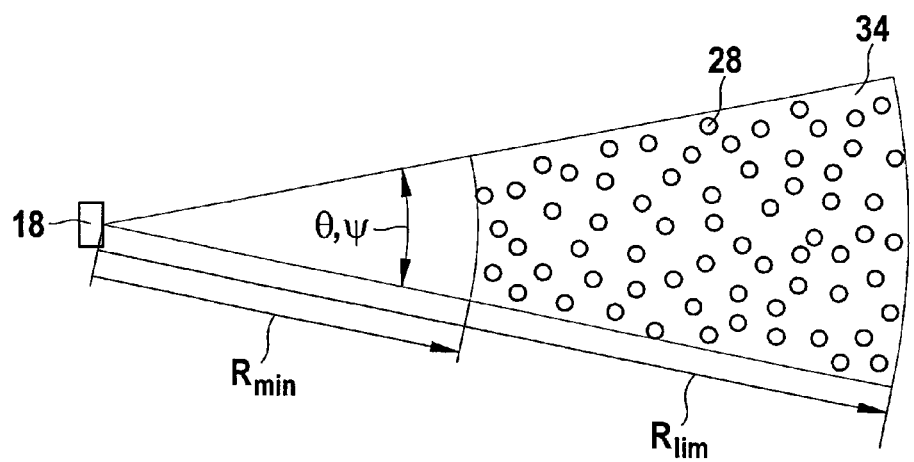
FIG. 3 shows an example of a radar cell for the detection of precipitation.

FIG. 3 illustrates schematically a radar cell 34, within which rain clutter may be detected. The horizontal of radar cell 34 extends across a specific azimuth angle range and the vertical extends across a specific elevation angle range. These angle ranges are determined by the form of the radar lobes emitted from the radar locating device. In the radial direction, radar cell 34 extends from a certain minimum distance $R_{min}$ below which a reliable locating of reflection targets is no longer possible, up to limit distance $R_{lim}$ mentioned, up to which the radar echo of individual drops 28 may still be measured as rain clutter.

Figure 4:
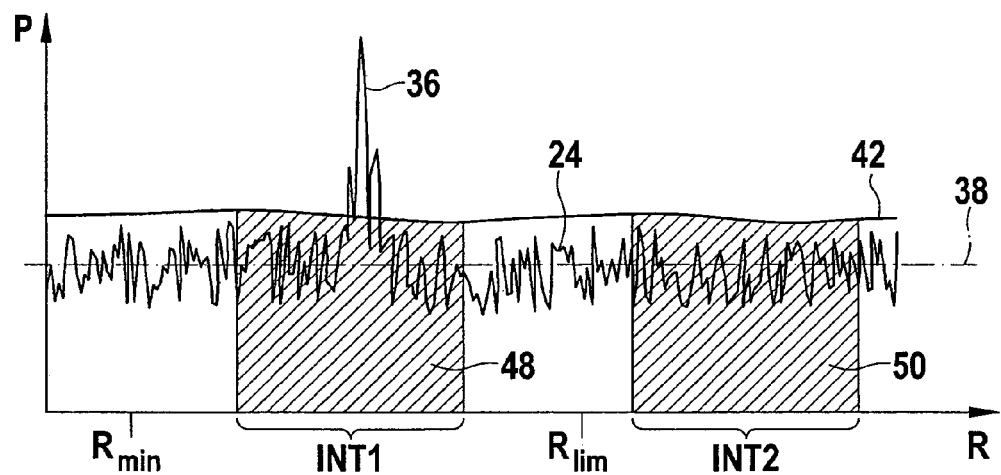
FIGS. 4 and 5 show examples for the evaluation of locating signals in accordance with the method according to the present invention.

FIG. 4 shows a typical curve of locating signal 24 for the case where no precipitation is present. In the example shown, a peak 36, which clearly stands out from noise background 38, represents a located object whose distance is smaller than the limit distance $R_{lim}$ for the detection of precipitation. For all remaining frequencies and distances, the average height of locating signal 24 is provided by the level of noise background 38, which is approximately constant over the entire distance range.

Figure 5:
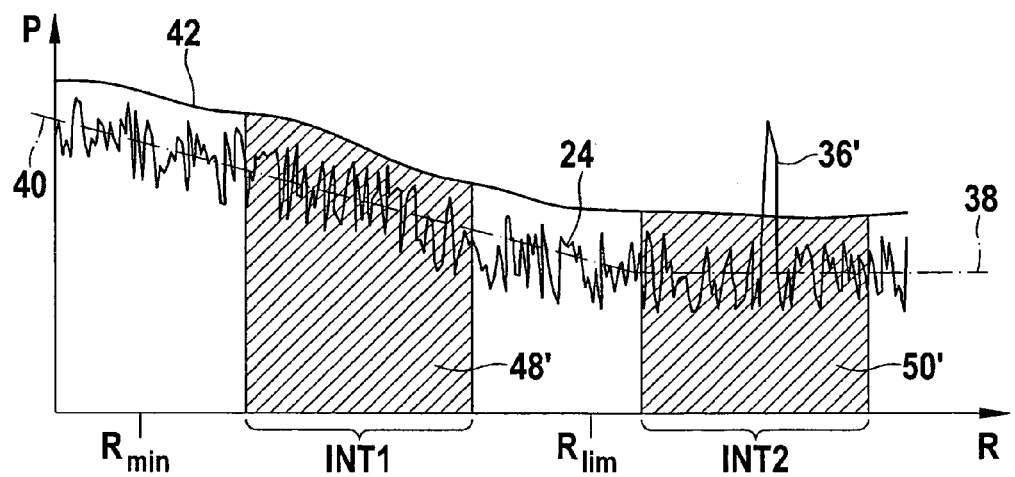

For comparison, FIG. 5 illustrates the curve of locating signal 24 with precipitation. In this instance, a peak 36' represents an object (vehicle) whose distance is greater than limit distance $R_{lim}$. The weakening of the radar signal through the reflection by drops 28 initially results in the reduction of the height of peak 36'. On the other hand, the reflection by these drops results in the rain clutter mentioned, which may be recognized in FIG. 5 outside of peak 36 in the form of a background signal 40, which is higher than noise background 38 and apart from that decreases as distance increases. Starting from limit distance $R_{lim}$, rain clutter can no longer be differentiated from the normal noise background and is thus no longer detectable.

A detection of precipitation is now in principle possible in that the power density of locating signal 24 is integrated over a distance interval INT1 that lies between minimum distance $R_{min}$ and limit distance $R_{lim}$. Since the normal noise background 38 for a specific type of the radar locating device is known, the value to be expected for this integral in the precipitation-free case is known, and if the current value of the integral is significantly greater, then this indicates the presence of precipitation.

However, if at least one object (peak 36) is located in distance interval INT1, over which integration is to occur in the event of precipitation detection, as in the case illustrated in FIG. 4, then peak 36 would result in an increase in the value of the integral in the precipitation-free case as well, and it would not be possible to determine whether the increase of the integral was brought about by the object alone or additionally by precipitation.

In the method provided here, locating signal 24 therefore is not integrated immediately, but rather this locating signal is first subjected to a filter procedure, for example, a noise estimation, which determines for each frequency value or distance value a detection threshold 42, which a peak 36, 36' caused by an object must at least surpass, in order for the corresponding object to be detected with certainty.

In FIG. 1, detection device 32 accordingly includes a filter stage 44 for the noise estimation and an integration stage 46 for the integration of the filtered signal, that is, of detection threshold 42.

As may be seen in FIGS. 4 and 5, in each instance detection threshold 42 extends approximately in parallel to noise background 38 and to background signal 40 (more specifically: at an approximately constant distance above this background signal), while it effectively "masks" each peak 36, 36' deriving from an object. Now if detection threshold 42 is integrated over interval INT1, then the integral obtained (in FIGS. 4 and 5 represented by a surface 48 and 48') is independent of whether or not an object is located in interval INT1.

In order to also achieve a greater independence with regard to other interference influences, in particular, with regard to temperature and aging effects that influence the sensitivity of the radar locating device, special installation conditions of the radar locating device, and the like, in the method provided here detection threshold 42 is not only integrated over interval INT1, which lies beneath limit distance $R_{lim}$, that is, in the ranges in which rain clutter may occur, but also over a second distance range INT2 (for example, of the same size), which lies above limit distance $R_{lim}$, that is, in the range in which the power density outside of object peaks is determined only by noise background 38. The corresponding integral is represented in FIGS. 4 and 5 by a surface 50 and 50'.

In the case of FIG. 4, that is, without precipitation, approximately the same value is obtained for the integrals represented by surfaces 48 and 50. As a rule, temperature influences and similar interference influences affect both integrals in the same manner.

In contrast, in FIG. 5, that is, in the event of precipitation, the value of the integral (surface 48') formed over first distance range INT1 is increased by the rain clutter, while the value of the integral (surface 50') formed over second distance range INT2 essentially remained the same.

Detection device 32 shown in FIG. 1 has a comparison stage 52 that is used to compare the integrals formed over first and second distance ranges INT1 and INT2 to each other and to determine the ratio of these two integrals to each other, for example. This ratio immediately provides a reliable index for the strength of the precipitation, a ratio in the proximity of one representing the precipitation-free state. Temperature drift and similar interference influences influence this ratio fundamentally significantly less than the absolute height of the integrals themselves. In this manner, an increased robustness is achieved with respect to the interference influences.

While in the example shown the spectrum of the intermediate frequency signal is evaluated, in a modified specific embodiment it is also possible to evaluate in a corresponding manner the time signal received in the analog/digital converter stage 20.

What is claimed is:

1. A method for detecting precipitation using a radar locating device for motor vehicles, that is designed to locate objects in the surroundings of the vehicle, comprising:
   integrating, by a computer processor, a locating signal over a first distance range, which is below a limit distance;
   integrating, by the computer processor, the locating signal over a second distance range, which is above the limit distance; and
   comparing, by the computer processor, the integrals over the first and second distance ranges with each other for the detection of the precipitation;
   wherein the limit distance is a distance from the vehicle beyond which clutter due to the precipitation is not differentiable and non-clutter objects are detectable.

2. The method as recited in claim 1, in which the locating signal is subjected to a filtering prior to the integration, which suppresses peaks caused by located objects, so that the filtered signal forms an index for the noise level as a function of the distance.

3. The method as recited in claim 2, in which the filtered signal is a detection threshold, which makes it possible to decide, with the aid of the criterion that a peak in the locating signal exceeds the detection threshold, whether the peak represents a located object.

4. A radar locating device for motor vehicles, which is designed to locate objects in the area in front of the vehicle, comprising a detection device, in which the method as recited in claim 1 is implemented.

5. The method as recited in claim 1, wherein the locating signal is an intermediate frequency signal.

6. The method as recited in claim 1, wherein the locating signal is a time signal.

7. The method as recited in claim 1, further comprising responsive to a comparison in which a first integral formed over the first distance range is greater than a second integral formed over the second distance range, determining that precipitation is present.

* * * * *

UNITED STATES PATENT AND TRADEMARK OFFICE
CERTIFICATE OF CORRECTION

PATENT NO.          : 8,581,774 B2
APPLICATION NO. : 13/138164
DATED                 : November 12, 2013
INVENTOR(S)        : Heilmann et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 202 days.

Signed and Sealed this
Twenty-second Day of September, 2015

Michelle K. Lee
*Director of the United States Patent and Trademark Office*